US006868382B2

(12) United States Patent
Shozakai

(10) Patent No.: US 6,868,382 B2
(45) Date of Patent: Mar. 15, 2005

(54) SPEECH RECOGNIZER

(75) Inventor: Makoto Shozakai, Kanagawa (JP)

(73) Assignee: Asahi Kasei Kabushiki Kaisha (JP)

( * ) Notice: Subject to any disclaimer, the term of this patent is extended or adjusted under 35 U.S.C. 154(b) by 215 days.

(21) Appl. No.: 09/802,768

(22) Filed: Mar. 9, 2001

(65) Prior Publication Data

US 2002/0116192 A1 Aug. 22, 2002

Related U.S. Application Data

(63) Continuation of application No. PCT/JP99/04885, filed on Sep. 8, 1999.

(30) Foreign Application Priority Data

Sep. 9, 1998 (JP) .......................... 10-255196

(51) Int. Cl.$^7$ ..................... G10L 15/04; G10L 15/08; G10L 15/28

(52) U.S. Cl. ................ 704/254; 704/231; 704/236; 704/255

(58) Field of Search ...................... 704/254, 256, 704/244, 240, 237, 222

(56) References Cited

U.S. PATENT DOCUMENTS

| | | | | |
|---|---|---|---|---|
| 4,718,094 A | * | 1/1988 | Bahl et al. | 704/256 |
| 4,817,156 A | * | 3/1989 | Bahl et al. | 704/256 |
| 5,025,471 A | * | 6/1991 | Scott et al. | 704/237 |
| 5,054,074 A | * | 10/1991 | Bakis | 704/240 |
| 5,182,773 A | * | 1/1993 | Bahl et al. | 704/222 |
| 5,677,988 A | * | 10/1997 | Takami et al. | 704/256 |
| 5,732,187 A | | 3/1998 | Scruggs et al. | |
| 5,794,204 A | * | 8/1998 | Miyazawa et al. | 704/244 |
| 5,799,277 A | * | 8/1998 | Takami | 704/256 |
| 5,839,105 A | * | 11/1998 | Ostendorf et al. | 704/256 |

FOREIGN PATENT DOCUMENTS

| | | | | |
|---|---|---|---|---|
| JP | 58-106329 | * | 6/1983 | ............. G06F/3/16 |
| JP | 63-32596 | | 2/1988 | |
| JP | 1-41912 B2 | | 9/1989 | |
| JP | 6-186995 | | 7/1994 | |
| JP | 7-104678 | | 11/1995 | |
| JP | 09097096 A | | 4/1997 | |
| JP | 09-097096 | * | 4/1997 | ............. G10L/3/00 |

OTHER PUBLICATIONS

Bahl et al ("Decision Trees For Phonological Rules In Continuous Speech", International Conference on Acoustics, Speech, an Signal Processing, Apr. 1991).*

Lee et al ("Allophone Clustering For Continuous Speech Recognition", International Conference on Acoustics, Speech, and Signal Processing, Apr. 1990).*

Takami et al., Automatic Generation of the Hidden Markov Network by Successive State Splitting on Contextual Domain and Temporal Domain, Denshi Jouhou Tsuushin Gakkai Gijutsu Kenkyuu Houkoku, Dec. 19, 1991, pp. 57–64.

Takami et al., A Successive State Splitting Algorithm For Efficient Allophone Modeling, Proceedings of 1992 IEEE International Conference on Acoustics, Speech and Signal Processing, vol. 1, 1992, pp. I–573–I–576.

(List continued on next page.)

*Primary Examiner*—Richemond Dorvil
*Assistant Examiner*—Daniel A Nolan
(74) *Attorney, Agent, or Firm*—Dickstein, Shapiro, Morin & Oshinsky, LLP.

(57) ABSTRACT

The generic word label series used for recognition of words uttered by unspecified speakers are stored in the vocabulary label network accumulation processing. The speech of a particular speaker is entered. Based on the input speech, the registered word label series extraction processing generates the registered word label series. The registered word label series of the particular speaker can then be registered with the vocabulary label network accumulation processing.

12 Claims, 13 Drawing Sheets

OTHER PUBLICATIONS

Jun–Ichi Takami et al., "Automatic Generation of the Hidden Markov Network by the Successive State Splitting Algorithm," ATR Interpreting Telephony Research Laboratories, Oct. 1991 (w/Partial Translation).

K. Kano, et al., "Digital Signal Processing of Speech/Sound Information" (w/Partial Translation), Nov. 19, 1997, Table of Contents, pp. 41–43, etc., Shokodo.

Yasuhiro Minami, et al., "Evaluation of Concatenated Training HMMs Using a Corpus for Speaker–Independent Continuous Speech Recognition," NTT Human Interface Laboratories, Jan. 24, 1992, pp. 41–47, vol. 91, No. 434, SP91–113, pp. 41–47 (in Japanese) (w/English Abstract).

Katsuteru Maruyama, et al., "English Word Recognition Using HMM Phone Concatenated Training," IEICE Technical Report, Jan. 26, 1989, vol. 88, No. 368, SP88–119, pages pp. 23–29 (in English).

Kazuya Takeda, et al., "A Hidden Markov Model Represented as Network of Acoustic Events," Collection I of Lecture Papers from the Spring 1991 Research Publication Meeting of the Acoustical Society of Japan, 3–P–13, Mar. 27, 1991, pp. 173–174 (w/Partial Translation).

Kazuya Takeda, et al., "Acoustic–event HMM Applied to Isolated Word and Continuous Speech Recognition," KDD R&D Laboratories, Collection I of Lecture Papers from the Autumn 1991 Research Publication Meeting of the Acoustical Society of Japan, 2–P–1, Oct. 1991, pp. 139–140 (w/Partial Translation).

Lawrence Rabiner, et al., "Fundamentals of Speech Recognition," 1993, pp. 441–447, Prentice Hall, Inc.

* cited by examiner

SPEECH RECOGNIZER

REFERENCE TO RELATED APPLICATION

This application is a continuation of International Application No. PCT/JP99/04885, filed Sep. 8, 1999.

TECHNICAL FIELD

The present invention relates to a speech recognizer and a speech recognition method capable of recognizing speech consisting of a mixed vocabulary of registered words unique to a particular person and generic words common to unspecified persons.

BACKGROUND ART

The technology for recognizing registered words unique to a particular person is generally called a specific speaker speech recognition. In the specific speaker speech recognition, a task is done whereby a particular person registers his or her voice of words he or she wants to be recognized. Specifically, this task involves converting speech samples of words, which the speaker generates in advance by uttering these words, into a sequence of feature parameters (called templates) and accumulating the sequence along with word labels into a storage device such as memory or hard disk. Among known methods of converting speech samples into a sequence of feature parameters are a cepstrum analysis and a linear prediction analysis. They are detailed in "Digital Signal Processing of Speech/Sound Information" (by K. Kano, T. Nakamura and S. Ise, published by Shokodo). The specific speaker speech recognition matches a feature parameter sequence converted from the input speech against the feature parameter sequence stored in the storage device and outputs, as a recognition result, a word label that has a feature parameter sequence most similar to the one converted from the input speech.

A widely used method of comparing the feature parameter sequence stored in the storage device and the feature parameter sequence converted from the input speech is dynamic time warping (DTW) based on dynamic programming. This method is detailed in the "Digital Signal Processing of Speech/Sound Information."

The technology for recognizing generic words common to unspecified persons is generally called an unspecified speaker speech recognition. In the unspecified speaker speech recognition, information on feature parameters of generic words common to unspecified speakers is stored in advance in a storage device, and thus there is no need to register the speech of words the user wants recognized as is required in the specific speaker speech recognition. Known methods of converting speech samples into a sequence of feature parameters include a cepstrum analysis and a linear prediction analysis as in the specific speaker speech recognition. Generating information on feature parameters of generic words common to unspecified speakers and comparing this information and the feature parameter sequence converted from the input speech are generally performed by a method using a Hidden Markov Model (HMM).

The unspecified speaker speech recognition is also detailed in the "Digital Signal Processing of Speech/Sound Information." In the case of Japanese language, for example, it is assumed that speech units are each composed of a set of phonemes, which are described in chapter 2 of the "Digital Signal Processing of Speech/Sound Information", and that individual phonemes are modeled by HMM. Table 1 shows a list of labels of phoneme set.

TABLE 1

| Vowel | a, i, u e o |
|---|---|
| Fricative | f, z, s, zh, sh, h |
| Plosive-fricative | dz, ts, dh, ch |
| Plosive | b, p, d, t, g, k |
| Half-vowel | w, r, y |
| Nasal | m, n, ng |

A phonetic sound of "CD" for instance can be modeled with a network of phoneme labels common to speakers (referred to as a generic word label sequence), as shown in FIG. 2A.

A phonetic sound of "MD" for instance can be modeled with a generic word label sequence shown in FIG, 2B. By preparing phoneme model data based on HMM and generic word label sequences, a person skilled in the art can construct an unspecified speaker speech recognizer using the Viterbi algorithm, which is described in chapter 4 of the "Digital Signal Processing of Speech/Sound Information."

In the speech recognizer, there is a need for a function to identify a mixed vocabulary made up of registered words unique to a particular speaker and generic words common to unspecified speakers. For example, in car audio equipment, there is a need to control such devices as "CD" and "MD" with voice commands for safety reasons. Because these device names can be set commonly by unspecified speakers, this requirement can be met by the unspecified speaker speech recognition technology, eliminating the registration process required by the specific speaker speech recognition technology. This is advantageous in terms of user interface.

There is also a need for a capability to select and play a desired among a plurality of CDs inserted in a CD changer. In this case, titles and singer names of the CDs inserted in the CD changer are considered to differ depending on the user. Thus, the specific speaker speech recognition technology, rather than the conventional unspecified speaker speech recognition, must be applied. That is, the user needs to register through voice the title names and singer names of the CDs to be inserted in the CD changer in advance. If speech recognition can be performed on a mixed vocabulary consisting of device names such as "CD" or "MD" and CD title names and singer names, there is no need to switch between a mode that can identify the generic words common to unspecified speakers, such as "CD" or "MD", and a mode that can identify the registered words unique to a particular speaker, such as CD title names and singer names. This is considered to be able to provide a user-friendly speech recognition function.

The specific speaker speech recognition has mostly used a DTW-based technique and the unspecified speaker speech recognition an HMM-based technique. One possible solution to the needs described above may be to combine the DTW-based specific speaker speech recognition and the HMM-based unspecified speaker speech recognition. The measures used in these two methods in matching the parameter sequences of input speech against the information on the parameter sequences of vocabulary stored in a storage device generally differ from each other. Hence, it is not easy to decide which word—a registered word unique to a particular speaker that is determined by the DTW-based specific speaker speech recognition as being closest to the input speech, or a generic word common to unspecified speakers that is determined by the HMM-based unspecified speaker speech recognition as being closest to the input speech—is closer to the input voice.

In the DTW-based specific speaker speech recognition, it is possible to realize the unspecified speaker speech recognition by using voice of a plurality of speakers for a generic word and storing a plurality of templates for that word. Using the DTW in this way can meet the above-described needs. This method, however, has drawbacks that the use of a plurality of templates for each generic word takes up extra storage space in the storage device, that the time taken by the DTW to reference a plurality of templates increases, and that when the generic words are to be changed, speech samples need to be collected from a large number of speakers.

To summarize, when the speech recognizer is mounted on car audio equipment, for example, while the use of the unspecified speaker speech recognizer is advantageous for the manufacturer because there is no need to register a large number of speech samples of the user, it gives the user a disadvantage that the recognition accuracy is slightly less than that of the specified speaker speech recognizer.

Although the specific speaker speech recognizer has a higher recognition accuracy, it is extremely difficult for the manufacturer to extract feature parameters from individual user's speech samples and store them in the speech recognizer in advance. If the user himself registers his speech, recording many words is very burdensome.

Further, because the conventional method used for the specific speaker speech recognition and the method used for the unspecified speaker speech recognition are different in kinds and nature, incorporating these two speech recognition methods into a single apparatus results in an increased size of the apparatus.

SUMMARY OF THE INVENTION

To deal with these problems, it is an object of this invention to provide a speech recognizer and a speech recognition method that can recognize the registered words uttered by a specific speaker with high precision even when an unspecified speaker speech recognition method is used, The present invention can provide a speech recognizer capable of performing word recognition on input speech by using information on models of speech units. Each speech unit is shorter than a word. The speech units are acoustic events generated by dividing a Hidden Markov Model of phoneme into individual states without changing the values of a transition probability and an output probability and the number of states. The speech recognizer comprises vocabulary label network accumulation means for accumulating label series of the speech units for generic words commonly used to perform word recognition on input speech of unspecified speakers. A registered word label series extraction means can be provided to generate label series of the speech units for registered words from input speech of the unspecified speakers and the generated registered word label series in the form of parallel networks in the vocabulary label network accumulation means.

According to another aspect of the present, a speech recognizer can be provided which is capable of performing word recognition on input speech by using information on models of speech units each shorter than a word. The speech units are acoustic events generated by dividing a Hidden Markov Model of phoneme into individual states without changing the values of a transition probability and an output probability and the number of states. The speech recognizer comprises vocabulary label network accumulation means for accumulating label series of the speech units for generic words commonly used to perform word recognition on input speech of unspecified speakers. A registered word label series extraction means can be provided to generate label series satisfying a connection of the speech units and having the highest probability in the label series of the speech units for registered words from input speech of a particular speaker by using a network in which the condition related to the connections of speech units is described. A registration means can be provided to register to add the generated registered word label series to the vocabulary label network accumulation means.

According to a further aspect of the present invention, there is provided a speech recognizer for perfuming word recognition on input speech by using information on models of speech units each shorter than a word. The speech units are acoustic events generated by dividing a Hidden Markov Model of phoneme into individual states without changing the values of a transition probability and an output probability and the number of states. The speech recognizer comprises vocabulary label network accumulation means for accumulating label series of the speech units for generic words commonly used to perform word recognition on input speech of unspecified speakers. A registered word label series extraction means can be provided generate label series satisfying a connection of the speech units and having the highest probability in the label series of the speech units for registered words from input speech of a particular speaker by using a network in which the condition related to the connections of speech units is described. A first registration means can be provided for storing the label series of speech units for generic words commonly used to perform word recognition on input speech of unspecified speakers and the generated registered word label series in the form of parallel networks in the vocabulary label network accumulation means. In one embodiment, the speech recognizer can further comprise a second registration means for registering generic words with the vocabulary label network accumulation means.

According to a still further aspect of the present invention, a speech recognizer can be provided which is capable of performing word recognition on input speech by using information on models of speech units. Each speech unit is shorter than a word. The speech units can be acoustic events generated by dividing a Hidden Markov Model of phoneme into individual states. Such speech recognizer comprises vocabulary label network accumulation means for accumulating label series of the speech units for generic words commonly used to perform word recognition on input speech of unspecified speakers. A registered word label series extraction means can be provided to generate label series of the speech units for registered words from input speech of a particular speaker. A first registration means can be provided to register to add to the vocabulary label network accumulation means the registered word label series thus generated. In one embodiment, the speech recognizer can comprise a second registration means for registering generic words with the vocabulary label network accumulation means. In another embodiment, the label series of speech units for the generic words commonly used for word recognition of input speech of the unspecified speakers and the generated registered word label series can be stored in the form of parallel networks in the vocabulary label network accumulation means.

According to the invention, the manufacturer of the speech recognizer needs only to provide label series of generic words for unspecified users as speech recognition data and the user can register desired words with his or her own voice. In other words, the specific speaker speech recognition function can be added to the unspecified speaker speech recognition method. It is therefore possible to provide a speech recognizer and a speech recognition method that are advantageous to both the user and the manufacturer.

BEST MODE FOR CARRYING OUT THE INVENTION

The present invention provides a speech recognizer that can identify speech consisting of a mixed vocabulary of registered words unique to a particular person and generic words common to unspecified persons by using the HMM that has conventionally been used in the unspecified speaker speech recognition. In the unspecified speaker speech recognition using the HMM, the recognition of generic words contained in the input speech is performed according to the Viterbi algorithm described above by using model data of speech units (syllables, half-syllables, phonemes, acoustic events, etc.), series of speech unit labels for generic words common to unspecified speakers, and information on connections between label series for each generic word.

If speech unit label series for registered words unique to a particular speaker can be obtained through some means, it is considered possible to perform recognition, according to the Viterbi algorithm, on a mixed vocabulary of the registered words unique to the particular speaker and the generic words common to unspecified speakers by adding the label series to the information on connections between the label series.

The method for obtaining the label series of speech units for the registered words unique to the particular speaker involves using connection information, by which speech units can be linked together in an arbitrary order and in an arbitrary length, instead of the inter-label series connection information for each generic word, and obtaining all the series of speech units contained in the input speech.

Figure 1:
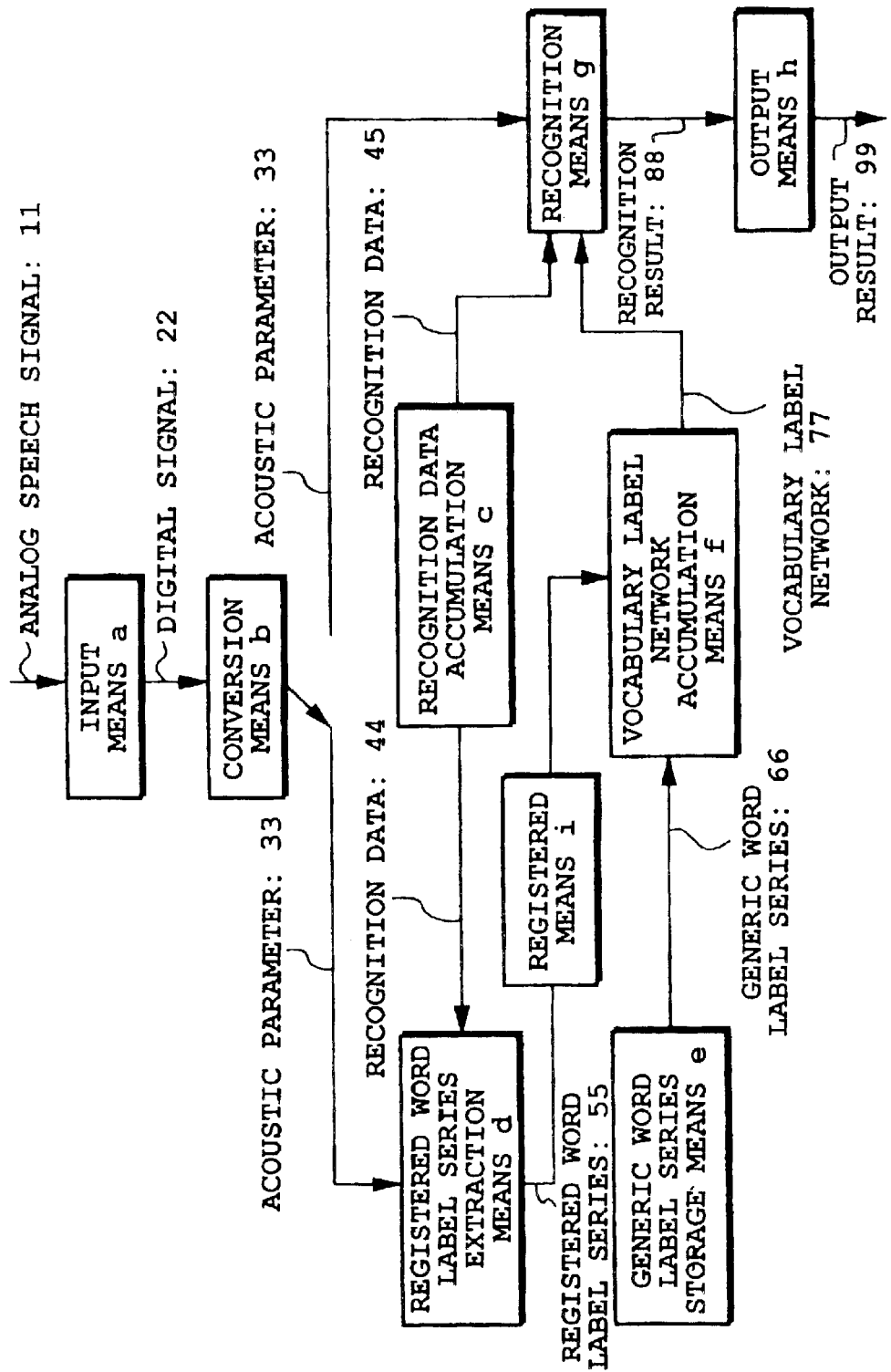
FIG. 1 is a block diagram showing a system configuration according to one embodiment of the invention.

Now, the embodiment of this invention will be explained in detail by referring to the accompanying drawings. FIG. 1 shows a basic configuration of one embodiment of the invention.

In FIG. 1, an analog speech signal 11 entered from a microphone (not shown) is converted into a digital signal 22 by an AD converter as an input means a. The digital signal 22 is converted into an acoustic parameter 33 in a predetermined frame period by a conversion means b. The acoustic (feature) parameter may use a cepstrum described in the "Digital Signal Processing of Speech/Sound Information" cited above.

(Registering Words Uttered by Specific Speaker)

Registering words unique to a particular speaker is done by specifying the word registration with a switch not shown on the speech recognizer and by connecting the conversion means b to a registered word label series extraction means d. The specific speaker, i.e., the user of car audio equipment connected with the speech recognizer, enters his or her desired speech into a microphone.

The analog speech signal 11 produced by the microphone is converted by the conversion means b into the acoustic parameter 33, which is then sent to the registered word label series extraction means d. The registered word label series extraction means d checks recognition data 44 accumulated in a recognition data accumulation means c such as hard disk and memory, recognizes the label series of speech units and converts the acoustic parameter 33 into a registered word label series 55 . The recognition data 44 stored in the recognition data accumulation means c include two data: model data of speech units modeled by the Hidden Markov Model and network data of speech unit models used to convert the acoustic parameter 33 into the registered word label series 55.

As described in U.S. Pat. No. 5,732,187, the speech unit is considered to include syllable, half-syllable and phoneme.

In the following, we take phonemes as an example and will explain the speech recognizer and speech recognition method for recognizing a mixed vocabulary of generic words common to unspecified speakers and registered words unique to a particular speaker. The network data of models of speech units (omitted in this case) used to convert the acoustic parameter 33 into the registered word label series 55 is a network representing the connections of allowable phonemes.

Figure 3:
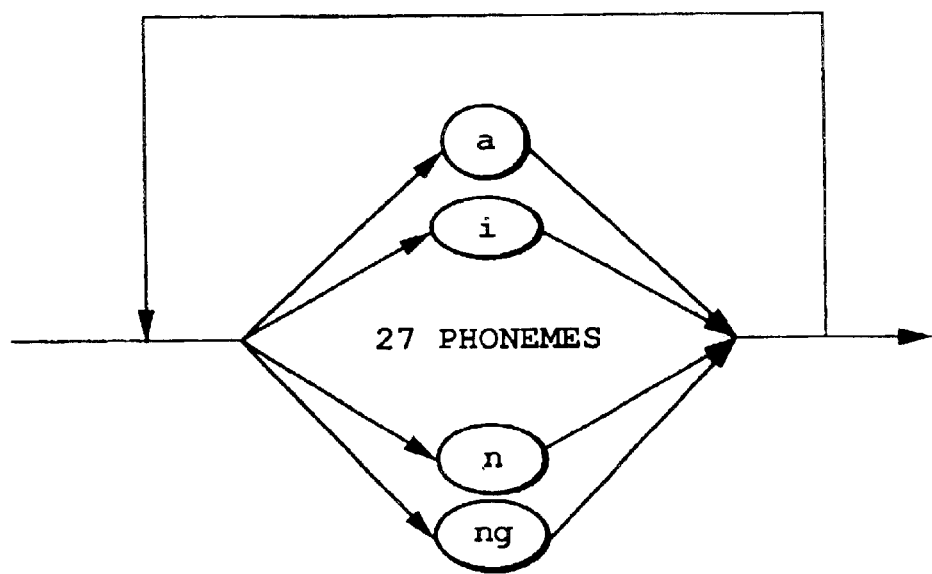
FIG. 3 is an explanatory diagram showing the content of a phonemic network.
Figures 4A, 4B:
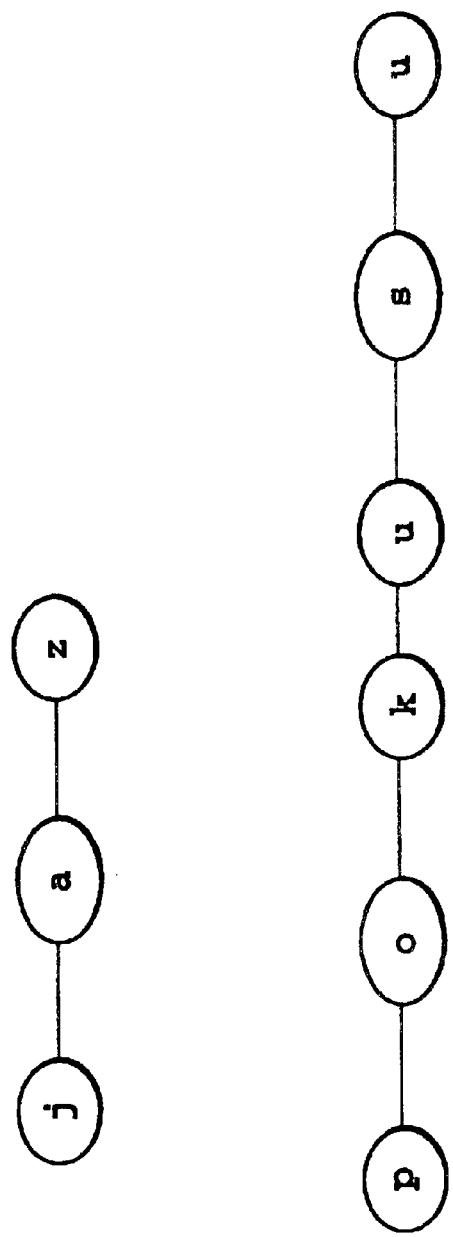
FIG. 4A is an explanatory diagram showing a sequence of registered word labels for "jazz".
FIG. 4B is an explanatory diagram showing a sequence of registered word labels for "pops".

A phonemic network, such as illustrated in FIG. 3, for instance, shows that the 27 phonemes in Table 1 can be connected in an arbitrary order and in an arbitrary length. By using the data of phoneme model according to the network data and HMM, it is possible to convert the speech of registered words unique to a particular speaker into phoneme label series according the Viterbi algorithm. FIG. 4A shows an example network of phoneme labels obtained from an input signal "jazz" uttered by a particular speaker for registration. If the phoneme recognition rate is 100%, the speech "jazz" should result in a phoneme label series of j+a+z+u. In this case, the last-phoneme of u becomes voiceless and is lost.

FIG. 4B shows an example network of phoneme labels obtained from an input signal "pops" uttered by a particular speaker for registration. If the phoneme recognition rate is 100%, the speech "pops" should result in a phoneme label series of p+o+p+u+s+u. In this case, the second "p" is replaced with "k" because phonemes "p, t, k" are generally difficult to identify. The network of phoneme labels obtained in this manner by the registered word label series extraction means d is referred to as a registered word label series 55. The registered word label series 55 is added, registered and stored in a vocabulary label network accumulation means f such as a hard disk or memory by a registration means i.

(Registering Generic Words Common to Unspecified Speakers)

Figure 2:
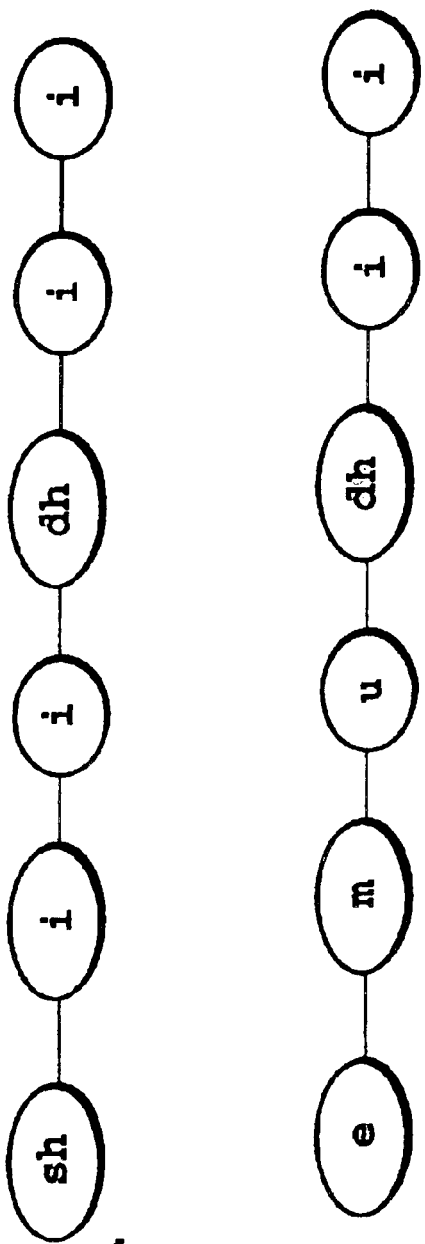
FIG. 2A is an explanatory diagram showing a sequence of generic word labels for "CD".
FIG. 2B is an explanatory diagram showing a sequence of generic word labels for "MD".

A network of phoneme labels can be extracted in advance from the spelling of a generic word common to unspecified speakers according to a rule. Alternatively, one or more phoneme label networks can be generated from one or more speech samples of a generic word from unspecified speakers in a way similar to that described above (similar to the word registration by a particular speaker). These networks are referred to as a generic word label series 66, and a means, such as CPU or RAM, for temporarily storing the data for transfer to the vocabulary label network accumulation means f is referred to as a generic word label series storage means e. For the generic words "CD" and "MD", for example, the generic label series shown in FIG. 2A and FIG. 2B are obtained. The data of the generic word label series may be recorded by the manufacturer onto a recording medium such as a floppy disk or CD, from which it is then transferred to the generic word label series storage means e within the speech recognizer. The generic word label series for the unspecified speakers are registered in the speech recognizer by being stored into the vocabulary label network accumulation means f via the generic word label series storage means e.

A vocabulary label network 77 accumulated in the vocabulary label network accumulation means f—which comprises the registered word label series 55 extracted from the registered word label series extraction means d and added and registered into the vocabulary label network accumulation means f by the registration means i and the generic word label series 66 stored in the generic word label series storage means e—can be constructed by the following three possible methods.

Figure 5:
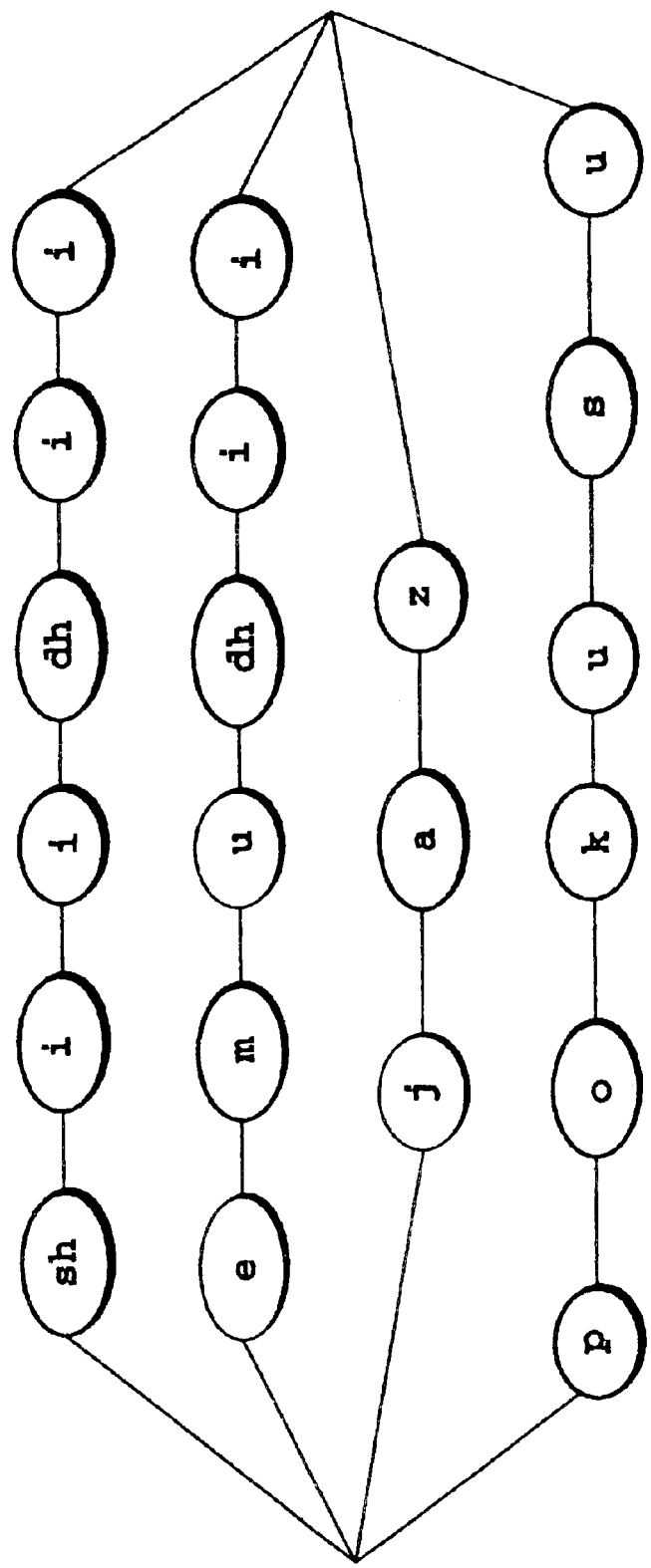
FIG. 5 is an explanatory diagram showing a mixed vocabulary label network consisting of generic words and registered words.

The first method involves generating a network containing both the registered word label series 55 and the generic word label series 66 and using it as a vocabulary label network 77. FIG. 5 shows a vocabulary label network connecting the generic word label series of "CD" and "MD" and the registered word label series of "jazz" and "pops".

With this network, it is possible to implement a speech recognizer that can recognize any of the four words, "CD" and "MD" as generic words and "jazz" and "pops" as registered words.

Figure 6:
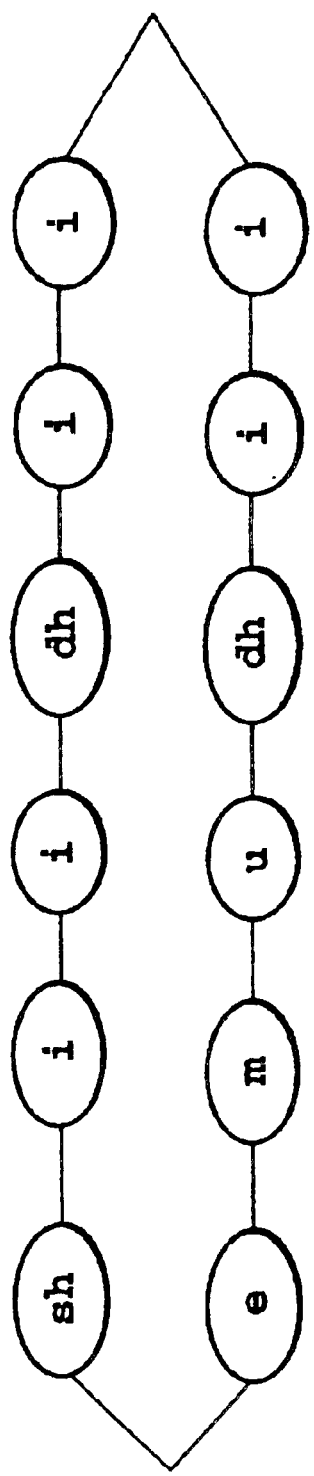
FIG. 6 is an explanatory diagram showing a vocabulary label network consisting only of generic words.

The second method involves generating a network containing only the generic word label series 66 and using it as the vocabulary label network 77. FIG. 6 shows a vocabulary label network connecting the generic word label series "CD" and "MD". With this network an unspecified speaker speech recognizer capable of recognizing either of the two generic words "CD" and "MD" can be implemented.

The second method involves generating a network containing only the registered word label series 55 and using it as the vocabulary label network 77. FIG. 6 shows a vocabulary label network connecting the generic word label series "CD" and "MD". With this network an unspecified speaker speech recognizer capable of recognizing either of the two generic words "CD" and "MD" can be implemented.

Figure 7:
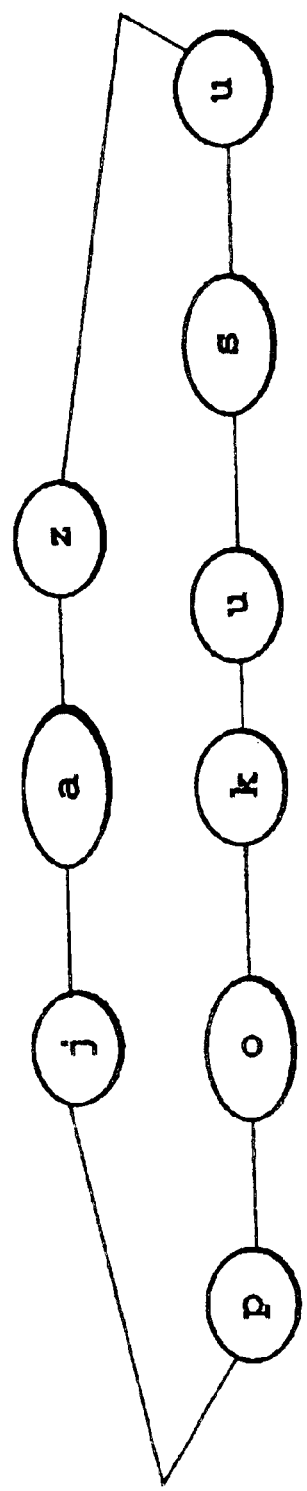
FIG. 7 is an explanatory diagram showing a vocabulary label network consisting only of registered words.

The third method involves generating a network containing only the registered word label series 55 and using it as the vocabulary label network 77. FIG. 7 shows a vocabulary label network connecting the registered word label series "jazz" and "pops". With this network a specific speaker speech recognizer capable of recognizing either of the two registered words "jazz" and "pops" can be implemented.

Operating the CD changer with a voice command may be realized by relating the label series of a generic word of unspecified speakers with an operation command in advance. If the recognition accuracy is not sufficient, the operation command may be related with the registered word label series obtained from the input speech of a particular speaker (user) according to the method described above. This process may, for example, involve displaying selectable operation commands on a display, selecting one of the operation commands with a cursor key, and entering a voiced word, that is to be related with this operation command, through a microphone to cause the registered word label series 55 extracted by the registered word label series extraction means d to be registered with the vocabulary label network accumulation means f through the registration means i. Further, if the combination of codes specifying the operation commands and corresponding registered word label series is stored in a hard disk in the form of a (correspondence) table, the subsequent operations can be specified by voice commands. The correspondence table can of course store the generic word label series prepared by the manufacturer and the corresponding operation command codes.

Operating the CD changer with a voice command may be realized by relating the label series of a generic word of unspecified speakers with an operation command in advance and then relating the command with the label series of a word registered by a particular speaker (user). This process may, for example, involve displaying selectable operation commands on a display, selecting one of the operation commands with a cursor key, and entering a voiced word, that is to be related with this operation command, through a microphone to cause the registered word label series 55 extracted by the registered word label series extraction means d to be registered with the vocabulary label network accumulation means f through the registration means i. Further, if the combination of codes specifying the operation commands and corresponding registered word label series is stored in a hard disk in the form of a (correspondence) table, the subsequent operations can be specified by voice commands. The correspondence table can of course store the generic word label series prepared by the manufacturer and the corresponding operation command codes.

(Speech Recognition Processing)

When the user specifies a speech recognition mode using a mode specification switch not shown, the conversion means b is switched over to the recognition means g. The recognition means g uses the acoustic parameter 33 entered from the input means a and converted by the conversion means b, the recognition data 45 made up of phoneme model data stored in the recognition data accumulation means c and the vocabulary label network 77 accumulated in the vocabulary label network accumulation means f, and produces a recognition result 88 for a word according to the Viterbi algorithm described above. The recognition result 88 is sent to an output means h, such as speaker and display, where it is output as an output result 99 in the form of voice and image. When a voice command is given to the CD changer, the correspondence table is checked to determine the content of the command according to the speech recognition result and a corresponding control program is executed.

In the above system configuration, the device operation can be controlled more precisely by registering frequently used commands in the form of words with the user's voice. The advantage of this system is that if the label series of a word registered by the user (particular speaker) is wrongly recognized during the label recognition process (during the conversion from the acoustic parameter into a label by using the recognition data), there is no adverse effect.

If a voice command is registered with an erroneously recognized label series, when the particular speaker utters the same command in the speech recognition mode, the speech recognizer produces the same erroneous recognition result, i.e., erroneously recognized label series of the registered command, selecting without failing the intended command that was related in advance.

When on the other hand the generic word label series for unspecified speakers is used for speech recognition, any erroneous label recognition causes a mismatch between the label series corresponding to the registered command and the erroneous recognition result or erroneously recognized label series, resulting in a possible failure of a voiced command to be recognized correctly. To deal with this situation, the particular speaker is allowed to register with his own voice any of the commands whose generic word label series are already prepared by the manufacturer, and to use the registered word label series of the particular speaker in the speech recognition mode to ensure a correct speech recognition.

In this embodiment, acoustic event models for unspecified speakers that are generated as speech units by decomposing the phonemes are used to recognize the registered words uttered by a particular speaker with high precision without regard to the language used.

In the following, let us explain about a case where states are used which, as speech units smaller than phonemes, make up the phonemic HMM. Generally, the phonemes are often modeled as an HMM made up of four states shown in FIG. 8.

A state 1 is an initial state and the transition of state should start from state 1. State 4 is an end state. When the state moves to state 4, no further state transition occurs. aij represents the probability of state i to go into state j and is called a transition probability.

If $j=i+1$, then $aii+aij =1.0$.

bi(x) represents the probability of an observation vector x being output when a state transition is made from state i, and is called an output probability. The observation vector often uses cepstrum for the acoustic parameter 33 of FIG. 1. The output probability bi(x) is represented by superimposing one or more normal distributions. The output probability may be formulated as a probability bi(x) of the observation vector x being output when a state transition to state i occurs, or as a probability bij(x) of the observation vector x being output when a status transition is made from state i to state j.

When the output probability bi(x) is formulated by superimposition of one or more normal distributions, an HMM is called a continuous HMM. Other modeling techniques involve modeling phonemes with semi-continuous HMM and discrete HMM. This invention can similarly be applied to these cases.

According to the method already known in literatures such as "Rabiner et al, Fundamentals of Speech Recognition, N. J., Prentice-Hall, 1993, ISBNO-13-015157-2, p. 441–447, the 4-state phonemic HMM shown in FIG. 8 is divided into three 2-state HMMs of FIG. 9, FIG. 10 and FIG. 11."Here, * represents a phoneme label in Table 1.

Figure 8:
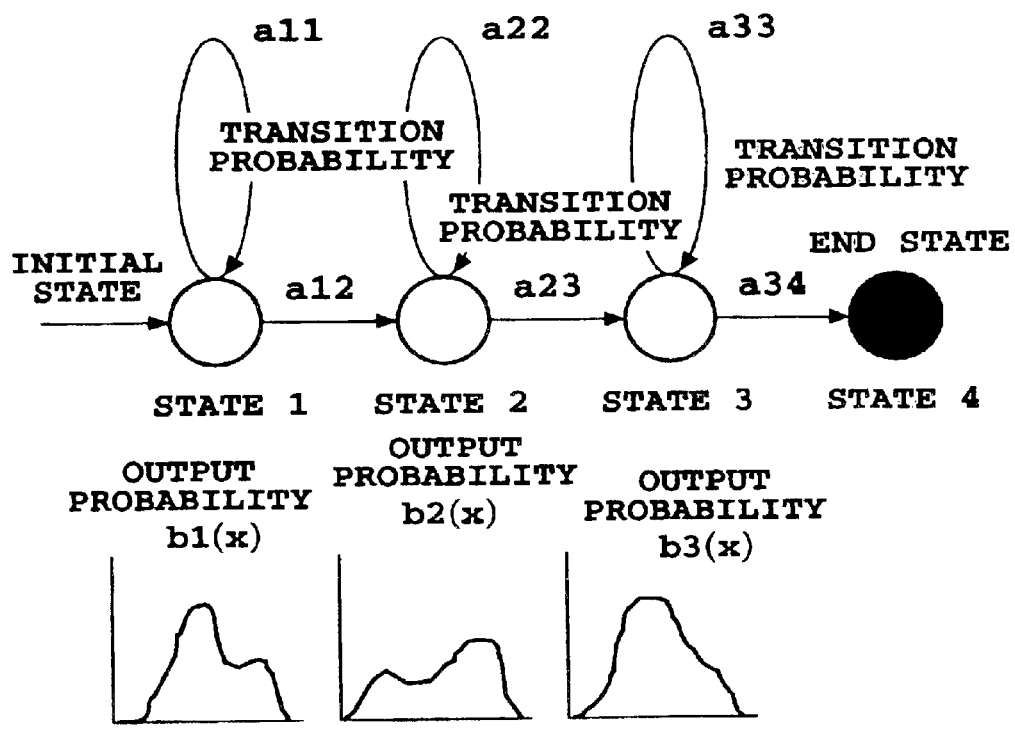
FIG. 8 is an explanatory diagram showing a phonemic HMM structure.
Figure 9:
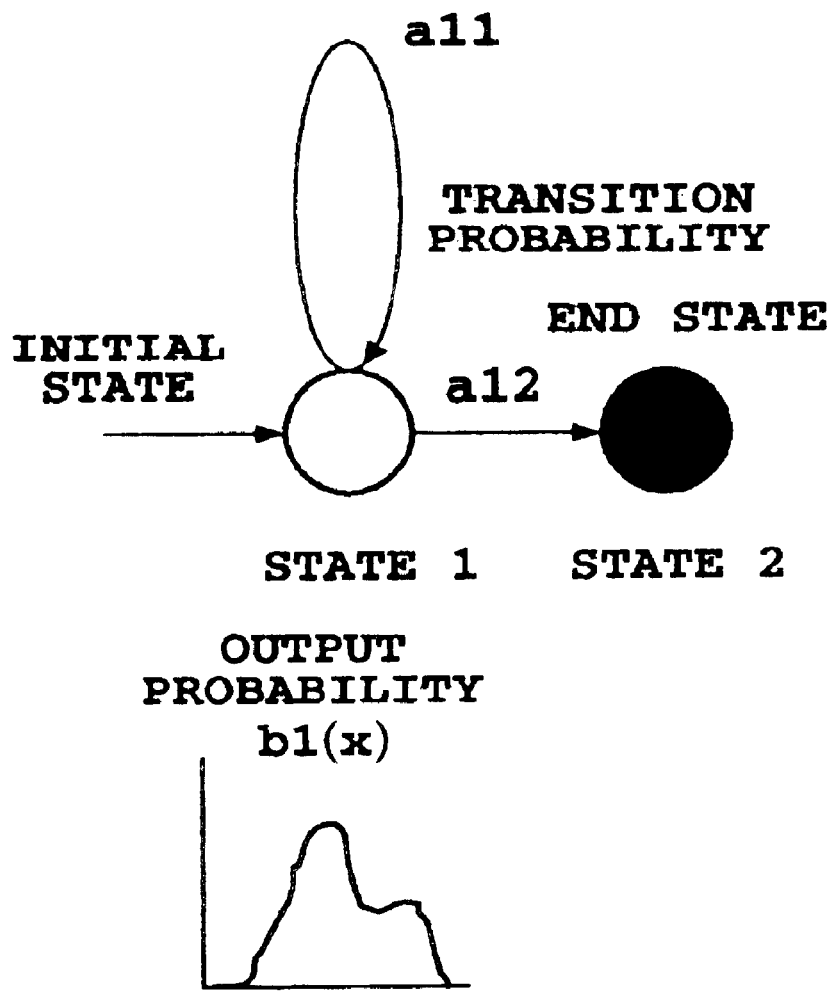
FIG. 9 is an explanatory diagram showing a structure of an acoustic event HMM*.1.
Figure 10:
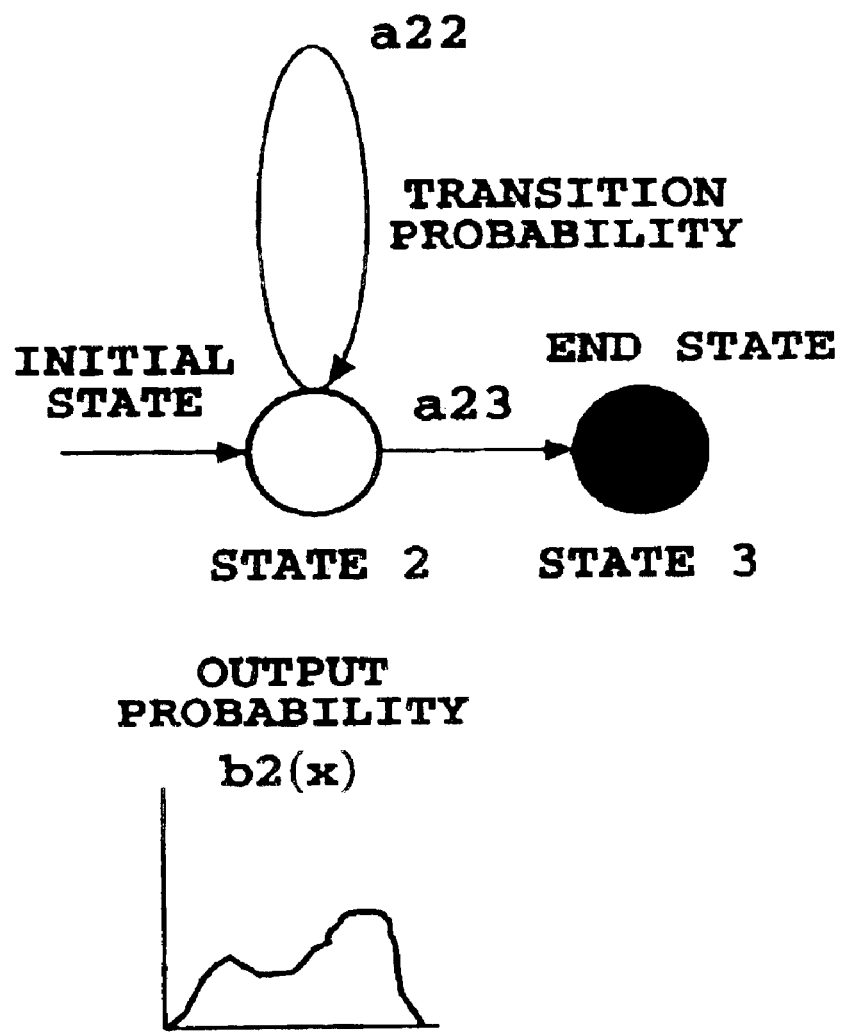
FIG. 10 is an explanatory diagram showing a structure of an acoustic event HMM*.2.
Figure 11:
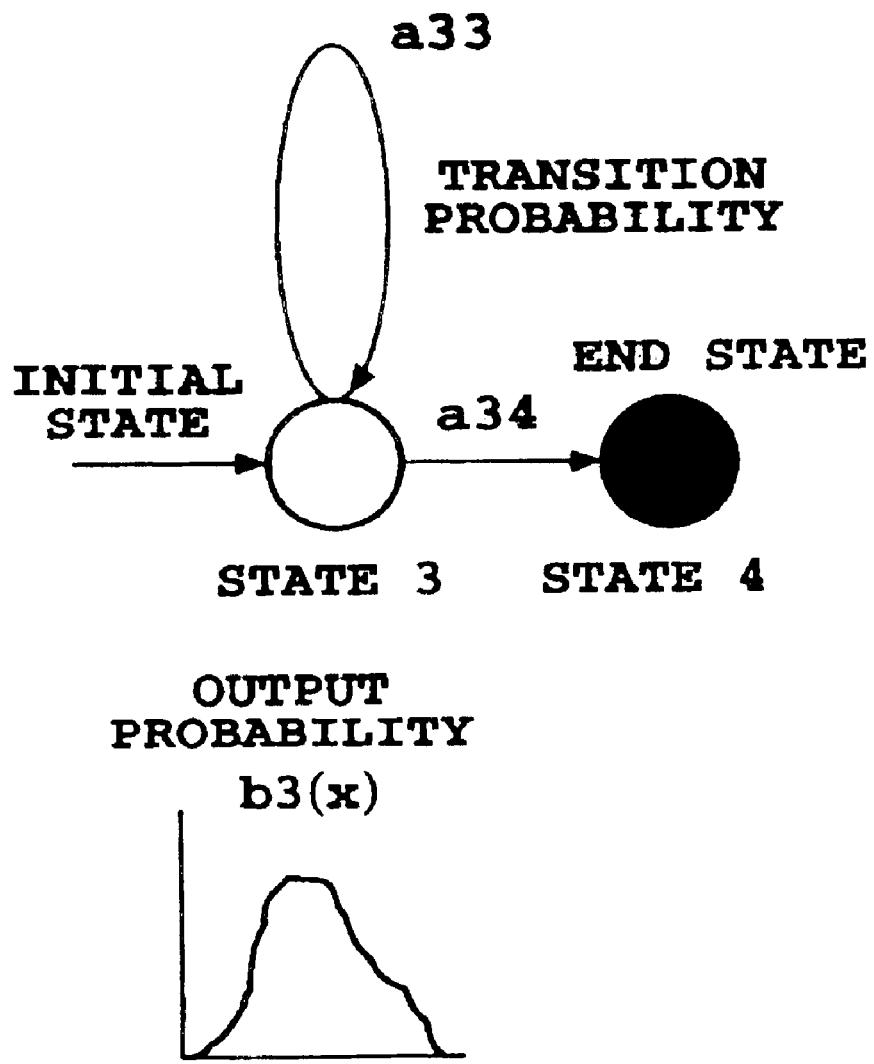
FIG. 11 is an explanatory diagram showing a structure of an acoustic event HMM*.3.

The 4-state phonemic HMM shown in FIG. 8 is divided into three 2-state HMMs of FIG. 9, FIG. 10 and FIG. 11. These are called acoustic event HMMs and represented as * .1, * .2 and * .3 corresponding to the state number. Here, * represents a phoneme label in Table 1.

Figure 12:
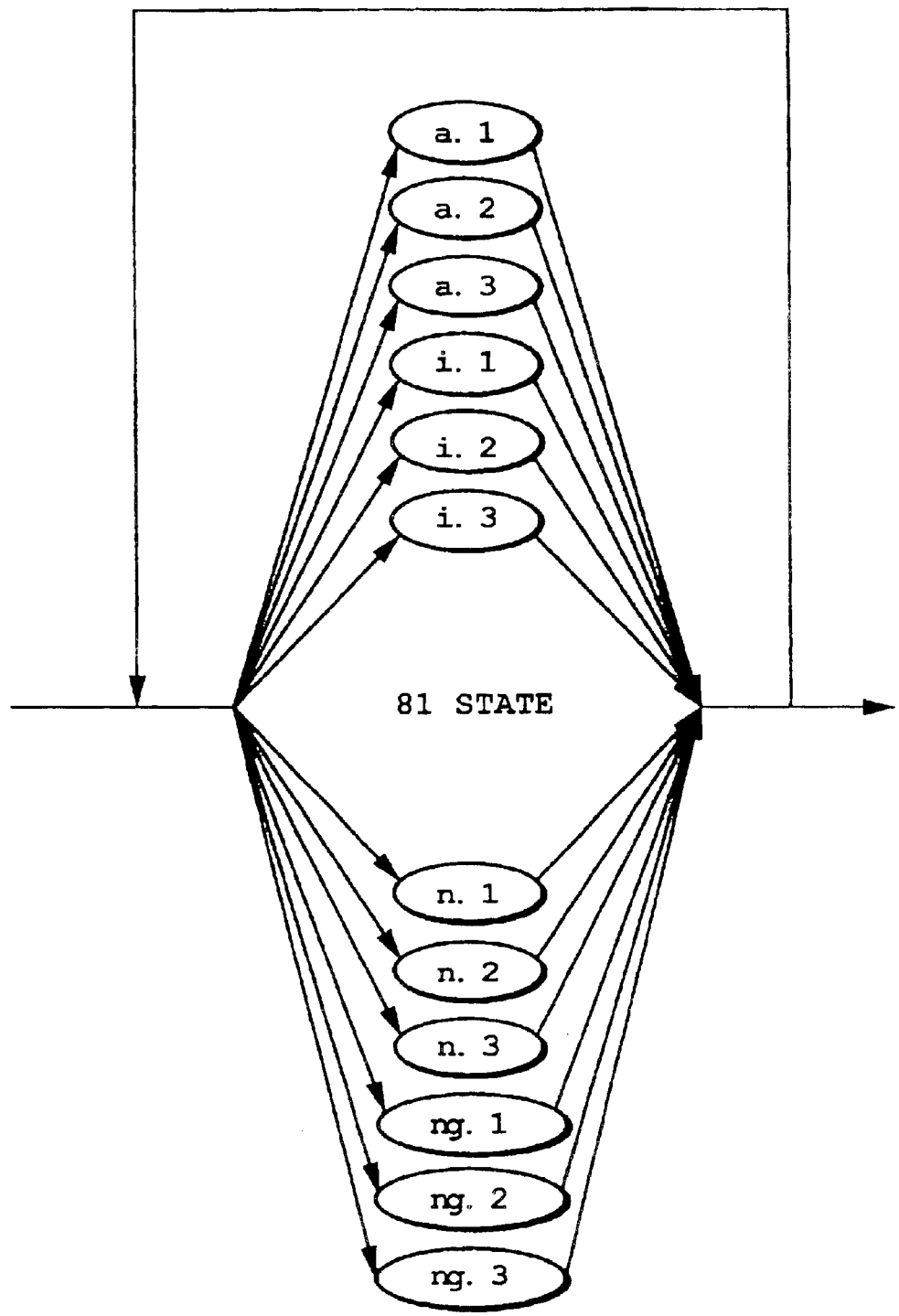
FIG. 12 is an explanatory diagram showing an unrestricted acoustic event network.

These newly generated HMMs can be considered to represent acoustic events in the phonemes and thus called acoustic event HMMs. As a method of dividing the phoneme HMM into acoustic event HMMs, the Successive State Splitting (SSS) methods ("A Successive State Splitting Algorithm for Efficient Allophone Modeling", Proceedings of 1992 IEEE International Conference on Acoustics, Speech and Signal Processing, Vo., 1, 1992 IEEE, Pages I-573 to I-576) is known which is based on the maximum likelihood estimation. This method uses speech data of many speakers and lots of computation time and memory to decompose a phoneme model into acoustic event HMMs. At this time, the transient probability and output probability are rewritten and the number of states increases from the initial value. The present invention, on the other hand, can divide the phoneme HMM prepared in advance for unspecified speakers into acoustic event HMMs with a simple operation as shown in FIGS. 9–11, without changing the parameters of the transition probability and output probability and the overall number of states. FIG. 12 shows a network in which the acoustic event HMMs generated as described above can be connected in an arbitrary order and in an arbitrary length. This network is called an unrestricted acoustic event network. The unrestricted acoustic event network has a higher freedom in the acoustic event series connection than the phonemic network of FIG. 3, and is thus considered to raise the acoustic event series representation capability that much higher.

These newly generated HMMs can be considered to represent acoustic events in the phonemes and thus called acoustic event HMMs. FIG. 12 shows a network in which these acoustic event HMMs can be connected in an arbitrary order and in an arbitrary length. This network is called an unrestricted acoustic event network. The unrestricted acoustic event network has a higher freedom in the acoustic event series connection than the phonemic network of FIG. 3, and is thus considered to raise the acoustic event series representation capability that much higher.

Therefore, compared with the phoneme series produced from the phoneme network of FIG. 3 according to the Viterbi algorithm, the acoustic event series produced from the unrestricted acoustic event network of FIG. 12 according to the Viterbi algorithm can be expected to approximate the uttered voice of the registered words unique to a particular speaker with greater accuracy.

Therefore, by using as the registered word label series 55 of FIG. 1 the acoustic event series produced from the unrestricted acoustic event network according to the Viterbi algorithm, it is considered possible to provide a higher recognition performance for the registered words.

The unrestricted acoustic event network of FIG. 12, however, has a large number of candidate acoustic event series that approximate the uttered speech of the registered words unique to the particular speaker so that the processing may take longer for the selection of the right acoustic event series.

Figure 13:
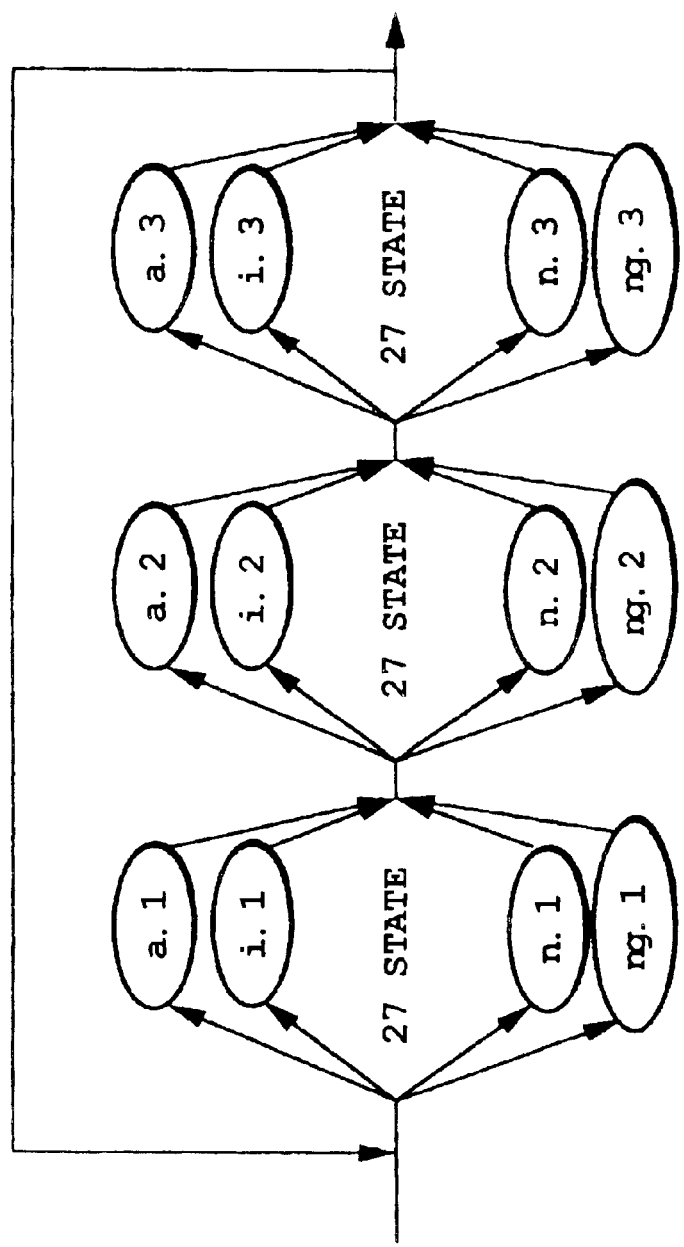
FIG. 13 is an explanatory diagram showing a position-restricted acoustic event network.

It is considered effective in reducing the processing time to use a network which is restricted in state position as shown in FIG. 13. The network of FIG. 13 is called a position-restricted acoustic event network. In this network, the number of acoustic events that can be connected is one-third of that in the unrestricted acoustic event network of FIG. 12, which means that the number of candidate acoustic event series that approximate the registered words unique to the particular speaker is reduced. This is considered to be able to shorten the time it takes to process and determine the right acoustic event series for approximating the registered words unique to the particular speaker, though with a slight degradation in the recognition performance.

A test was conducted to compare the phoneme series and the acoustic event series in the recognition performance for the registered words of a particular speaker.

Phoneme series for 128 words were determined by the Viterbi algorithm from the Japanese phoneme HMM and the phoneme network of FIG. 3 and used as a recognition vocabulary. Two males and two females were chosen to speak words in languages of Japanese, English, French, German and Italian for the specific speaker word recognition. The average rate and the lowest rate of the speech recognition performed are shown in Table 2. The voice-to-noise ratio is 10 dB in each case.

TABLE 2

Specific speaker word recognition performance when phoneme network is used

| Language | Japanese | English | French | German | Italian |
| --- | --- | --- | --- | --- | --- |
| Average recognition rate | 93.6% | 86.9% | 88.7% | 92.2% | 91.4% |
| Lowest recognition rate | 92.2% | 82.8% | 83.6% | 85.2% | 87.5% |

Next, acoustic event series for 128 words were determined by the Viterbi algorithm from the acoustic event HMM generated by decomposing the Japanese phoneme HMM according to the method described above and from the position-restricted acoustic event network of FIG. 13. The acoustic event series thus obtained were used as a recognition vocabulary. The average rate and the lowest rate of the specific speaker word recognition performed in Japanese, English, French, German and Italian are shown in Table 3.

TABLE 3

Specific speaker word recognition performance when position-restricted acoustic event network is used

| Language | Japanese | English | French | German | Italian |
| --- | --- | --- | --- | --- | --- |
| Average recognition rate | 97.5% | 92.9% | 94.0% | 94.0% | 93.6% |
| Lowest recognition rate | 96.1% | 91.1% | 92.2% | 91.4% | 91.4% |

Comparison between Table 2 and Table 3 shows that the use of the acoustic event series improves the average recognition rate over that obtained when the phoneme series is used by about 2–6%. It is also found that the lowest recognition rate is improved by 4–8%. These results show that, compared with the phoneme series obtained from the phoneme network of FIG. 3 according to the Viterbi algorithm, the use of the acoustic event series obtained from the position-restricted acoustic even network of FIG. 13 according to the Viterbi algorithm provides a higher recognition performance for the registered words unique to a particular speaker. The superiority of the acoustic event series is considered due to the fact that the acoustic event series has a higher precision of approximation of the registered words unique to a particular speaker than the phoneme series even when the acoustic event network with restrictions, such as a position-restricted acoustic event network of FIG. 13, is used. Further, JP7-104678, B2 (Sanyo Denki K.K.) 13Nov. 1995 (13.11.95) (with no family) describes a speech recognizer that generates a label series of speech unit from the input speech of a particular speaker and additionally registers the generated label series. This literature, however, discloses a method that uses a syllable as the speech unit and, as described in the section of "Embodiment", first registers standard patterns of syllables as the speech units (such as "a" and "I") and then registers the speech o a desired word by using the registered standard patterns of syllables. In other words, the cited technology requires the registration of the standard patterns of syllables of a particular speaker and, without it, is unable to register an arbitrary word in the form of label series of syllables with a precision high enough to ensure a high recognition performance.

With this invention on the other hand, we have reached a conclusion that, as shown in Table 3, not only can desired registration words, whether Japanese or otherwise, of a particular speaker be verbally registered in an unspecified speaker speech recognizer by simply using the acoustic events such as shown in FIGS. 9–11 generated by a simple methods that does not change the values of transition probability or output probability nor the number of states, but a high recognition performance can also be obtained. This constitutes the basis of the inventiveness of this invention as opposed to the conventional technology described earlier.

Comparison between Table 2 and Table 3 shows that the use of the acoustic event series improves the average recognition rate over that obtained when the phoneme series is used by about 2–6%. It is also found that the lowest recognition rate is improved by 4–8%. These results show that, compared with the phoneme series obtained from the phoneme network of FIG. 3 according to the Viterbi algorithm, the use of the acoustic event series obtained from the position-restricted acoustic event network of FIG. 13 according to the Viterbi algorithm provides a higher recognition performance for the registered words unique to a particular speaker. The superiority of the acoustic event series is considered due to the fact that the acoustic event series has a higher level of approximation of the words unique to a particular speaker than the phoneme series. This constitutes the basis of this invention.

The above embodiment may be implemented in the following arrangements.

1) The system configuration shown in FIG. 1 may be implemented by digital circuits or by software processing in microcomputer and personal computer. In this case, the functions of the conversion means b, the registered word label series extraction means d and the recognition means g can be realized by executing the software by CPU. The circuit configuration may be determined according to the use of the speech recognizer. For example, when characters and control keys are entered into a personal computer through dictation, the system of FIG. 1 may be built using the CPU and hard disk etc. in the personal computer.

2) In the above embodiment, while the generic word label series common to unspecified speakers can be registered with the speech recognizer from a CD-ROM, it is also possible to store them in a non-volatile programmable memory built into the speech recognizer, such as EEPROM. In that case, unlisted words and those words for which the user wishes to enhance the recognition precision may be registered by the spoken words of the user.

What is claimed is:

1. A speech recognizer for performing word recognition on input speech by using information on models of speech units each shorter than a word, the speech recognizer comprising:

vocabulary label network accumulation means for accumulating label series of said speech units for generic words commonly used to perform word recognition on input speech of unspecified speakers;

registered word label series extraction means for generating label series of said speech units for registered words from input speech of a particular speaker; and registration means for storing the label series of speech units for the generic words commonly used for word recognition of input speech of said unspecified speakers and the generated registered word label series in the form of parallel networks in said vocabulary label network accumulation means:

wherein said speech units are acoustic events generated by dividing a Hidden Markov Model of phoneme into individual states while maintaining the values of a transition probability and an output probability and the number of states.

2. The speech recognizer as claimed in claim 1, further comprising means for registering said generic words with said vocabulary label network accumulation means.

3. The speech recognizer for performing word recognition on input speech by using information on models of speech units each shorter than a word the speech recognizer comprising:

vocabulary label network accumulation means for accumulating label series of said speech units for generic words commonly use to perform word recognition on input speech of unspecified speakers:

registered word label series extraction means for generating label series satisfying a connection of said speech units and having the highest probability in the label series of said speech units for registered words from input speech of a particular speaker by using a network in which said connection of the speech units related to the connections of speech units is described: and registration means for registering to add the generated registered word label series to said vocabulary label network accumulation means:

wherein said speech units are acoustic events generated by dividing a Hidden Markov Model of phoneme into individual states while maintaining the values of a transition probability and an output probability and the number of states.

4. The speech recognizer as claimed in claim 3, further comprising means for registering said generic words with said vocabulary label network accumulation means.

5. The speech recognizer for performing word recognition on input speech by using information on models of speech units each shorter than a word, the speech recognizer comprising:

vocabulary label network accumulation means for accumulating label series of said speech units for generic words commonly used to perform word recognition on input speech of unspecified speakers:

registered word label series extraction means for generating label series satisfying a connection of said speech units and having the highest probability in the label series of said speech units for registered words from input speech of a particular speaker by using a network in which said connection of the speech units related to the connections of speech units is described: and registration means for storing said label series of speech units for generic words commonly used to perform word recognition on input speech of unspecified speakers and the generated registered word label series in the form of parallel networks in said vocabulary label network accumulation means:

wherein said speech units are acoustic events generated by dividing a Hidden Markov Model of phoneme into individual states while maintaining the values of a transition probability and an output probability and the number of states.

6. The speech recognizer as claimed in claim 5, further comprising means for registering said generic words with said vocabulary label network accumulation means.

7. A speech recognition method for performing word recognition on input speech by using information on models of speech units each shorter than a word, wherein label series of said speech units for generic words commonly used to perform word recognition on input speech of unspecified speakers are accumulated in vocabulary label network accumulation means;

said method comprising steps of:

generating label series of said speech units for registered words from input speech of a particular speaker; and storing said label series of speech units for generic words commonly used to perform word recognition on input speech of unspecified speakers and the generated registered word label series in the form of parallel networks in said vocabulary label network accumulation means wherein said speech units are acoustic events generated by dividing a Hidden Markov Model of phoneme into individual states while maintaining the values of a transition probability and an output probability and the number of states.

8. The speech recognition method as claimed in claim 7, wherein said generic words can be registered with said vocabulary label network accumulation means.

9. A speech recognition method for performing word recognition on input speech by using information on models of speech units each shorter than a word.

wherein label series of said speech units for generic words commonly used to perform word recognition on input speech of unspecified speakers are accumulated in vocabulary label network accumulation means;

said method comprising steps of:

generated label series satisfying a connection of said speech units and having the highest probability in the label series of said speech units for registered words from input speech of a particular speaker by using a network in which said connection of the speech units related to the connections of speech units is described: and registering to add the generated registered word label series to said vocabulary label network accumulation means:

wherein said speech units are acoustic events generated by dividing a Hidden Markov Model of phoneme into individual states while maintaining the values of a transition probability and an output probability and the number of states.

10. The speech recognition method as claimed in claim 9, wherein said generic words is possible to be registered to said vocabulary label network accumulation means.

11. A speech recognition method for performing word recognition on input speech by using information on models of speech units each shorter than a word.

wherein label series of said speech units for generic words commonly used to perform word recognition on input speech of unspecified speakers are accumulated in vocabulary label network accumulation means:

said method comprising steps of:

generating label series satisfying a connection of said speech units and having the highest probability in the label series of said speech units for registered words from input speech of a particular speaker by using a network in which said connection of the speech units related to the connections of speech units is described: and storing said label series of speech units for generic words commonly use to perform word recognition in input speech of unspecified speakers and the generated registered word label series in said vocabulary label network accumulation means;

wherein said speech units are acoustic events generated by dividing a Hidden Markov Model of phoneme into individual states while maintaining the values of a transition probability and an output probability and the number of states.

12. The speech recognition method as claimed in claim 11, wherein said generic words is possible to be registered to said vocabulary label network accumulation means.

* * * * *